(12) United States Patent
Yokoyama

(10) Patent No.: US 11,269,157 B2
(45) Date of Patent: Mar. 8, 2022

(54) OPTICAL APPARATUS

(71) Applicant: CANON KABUSHIKI KAISHA, Tokyo (JP)

(72) Inventor: Akira Yokoyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 693 days.

(21) Appl. No.: 16/177,719

(22) Filed: Nov. 1, 2018

(65) Prior Publication Data

US 2019/0137729 A1 May 9, 2019

(30) Foreign Application Priority Data

Nov. 6, 2017 (JP) .............................. JP2017-213582

(51) Int. Cl.
*G02B 7/10* (2021.01)
*G02B 7/02* (2021.01)

(52) U.S. Cl.
CPC ............... *G02B 7/10* (2013.01); *G02B 7/021* (2013.01)

(58) Field of Classification Search
CPC . G02B 7/02; G02B 7/021; G02B 7/04; G02B 7/09; G02B 15/00; G02B 15/14; G02B 7/10–105; G02B 15/142–1425
USPC ................ 359/642, 676, 683, 691, 694–706, 359/822–826; 352/139, 140; 396/382, 396/72
See application file for complete search history.

(56) References Cited

U.S. PATENT DOCUMENTS

| 4,764,784 | A | * | 8/1988 | Torikoshi | ................. | G02B 7/10 359/705 |
| 5,037,187 | A | * | 8/1991 | Oda | ......................... | G02B 7/10 359/699 |
| 6,104,551 | A | | 8/2000 | Matsui | | |
| 6,147,814 | A | * | 11/2000 | Kitazawa | ................. | G02B 7/10 359/699 |
| 6,741,401 | B2 | * | 5/2004 | Nomura | ................... | G02B 7/10 359/699 |

(Continued)

FOREIGN PATENT DOCUMENTS

| JP | H05241059 A | 9/1993 |
| JP | H08166530 A | 6/1996 |

(Continued)

OTHER PUBLICATIONS

Office Action issued in Japanese Appln. No. 2017-213582 dated Oct. 5, 2021.

*Primary Examiner* — Nicholas R. Pasko
(74) *Attorney, Agent, or Firm* — Rossi, Kimms & McDowell LLP

(57) ABSTRACT

Provided is an optical apparatus including: a first optical element configured to be movable in an optical axis direction; a second optical element configured to be movable in the optical axis direction; a first elastic member configured to bias the first optical element in the optical axis direction; and a second elastic member configured to bias the first optical element and the second optical element in the optical axis direction due to reduction in distance between the first optical element and the second optical element, wherein the second elastic member is configured to bias the first optical element, due to the reduction, in a direction in which the first elastic member biases the first optical element.

16 Claims, 6 Drawing Sheets

(56) References Cited

U.S. PATENT DOCUMENTS

| | | | |
|---|---|---|---|
| 7,230,773 B2 * | 6/2007 | Nomura | G02B 7/102 |
| | | | 359/696 |
| 7,852,578 B2 * | 12/2010 | Iwasaki | G02B 13/009 |
| | | | 359/819 |
| 9,019,403 B2 * | 4/2015 | Ohya | H04N 5/23296 |
| | | | 348/240.3 |
| 10,254,506 B2 | 4/2019 | Tanaka | |
| 2006/0109565 A1 * | 5/2006 | Watanabe | G02B 7/102 |
| | | | 359/694 |

FOREIGN PATENT DOCUMENTS

| | | |
|---|---|---|
| JP | H1184201 A | 3/1999 |
| JP | H11326734 A | 11/1999 |
| JP | 2003050342 A | 2/2003 |
| JP | 2003140018 A | 5/2003 |
| JP | 2014048467 A | 3/2014 |
| JP | 2017083527 A | 5/2017 |

* cited by examiner

OPTICAL APPARATUS

BACKGROUND OF THE INVENTION

Field of the Invention

The present invention relates to an optical apparatus.

Description of the Related Art

Hitherto, there has been known an optical apparatus such as a lens apparatus which is configured to perform zooming, focusing, or light amount adjustment by moving, in an optical axis direction, a lens frame holding a lens and optical elements (optical devices) such as a stop configured to adjust a light amount.

With regard to a zoom lens apparatus, there has been known a structure in which at least two lens units including a variator lens unit configured to move to change a size of an image and a compensator lens unit configured to move to reduce a change in position of an image plane. With regard to such lens apparatus, it has been known that, for example, as a distance between the variator lens unit and the compensator lens unit is reduced so that a focal length increases, an influence of an error of the distance between the two lens units on an optical performance of the lens apparatus becomes greater. Therefore, for the purpose of precisely positioning the optical elements, there has been employed a structure of urging the optical elements in one direction with, for example, a spring member.

In Japanese Patent Application Laid-Open No. H08-166530, the following structure is disclosed. That is, magnets are mounted to movable frames for a plurality of lens units to reduce a backlash between the lens units by magnetic force. In Japanese Patent Application Laid-Open No. H11-326734 the following structure is disclosed. That is, cam followers of two zoom lens units are engaged with one cam groove, and the two zoom lens units are biased by a plurality of spring members disposed therebetween, thereby preventing occurrence of optical axis misalignment between the zoom lens units.

With the related art disclosed in Japanese Patent Application Laid-Open No. H08-166530, the magnetic force significantly changes in accordance with a distance between the lens units, and as the distance between the lens units increases, the effect of reducing the backlash becomes smaller. Further, a mass of the magnets is added to the lens units. Thus, a strong and large magnet is required to attain the effect of reducing the backlash. As a result, a rotation resistance of a cam barrel increases, which may cause disadvantage in terms of operability of the lens unit. Moreover, with the related art disclosed in Japanese Patent Application Laid-Open No. H11-326734, the two zoom lens units operate integrally with each other, with the result that the moving mass increases. Thus, particularly in the case of drive with the cam groove having a steep angle causing a large moving amount, the rotation resistance of the cam barrel increases, which may be disadvantageous in terms of operability of the lens unit.

SUMMARY OF THE INVENTION

The present disclosure provides, for example, an optical apparatus advantageous in precise positioning and operability of an optical element therein.

In order to achieve the object described above, an optical apparatus according to one embodiment of the present invention includes: a first optical element configured to be movable in an optical axis direction; a second optical element configured to be movable in the optical axis direction; a first elastic member which is configured to bias the first optical element in the optical axis direction; and a second elastic member configured to bias the first optical element and the second optical element in the optical axis direction due to reduction in distance between the first optical element and the second optical element, wherein the second elastic member is configured to bias the first optical element, due to the reduction, in a direction in which the first elastic member biases the first optical element.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, exemplary embodiments of the present invention are described in detail with reference to FIG. 1 to FIG. 4.

First Embodiment

Figure 1:
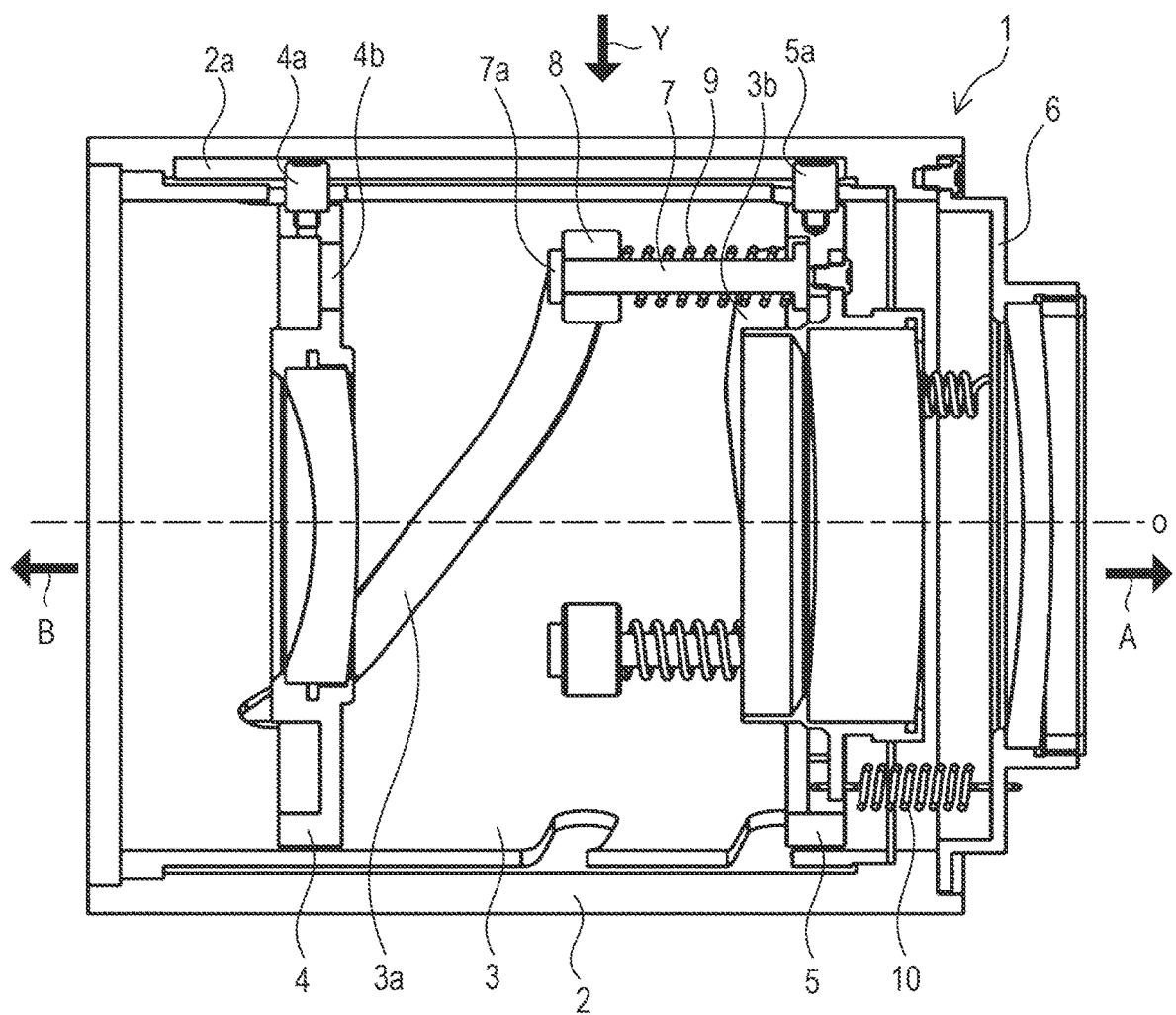
FIG. 1 is a sectional view for illustrating a zoom unit mechanism in a first embodiment of the present invention.

With reference to FIG. 1 to FIG. 4, description is made of a lens apparatus (optical apparatus) according to a first embodiment of the present invention. FIG. 1 is a sectional view for illustrating a zoom mechanism unit 1 of the lens apparatus according to the first embodiment.

The zoom mechanism unit 1 of the lens apparatus includes a fixed barrel 2, a cam barrel 3, a variator lens support frame 4, a compensator lens support frame 5, and a fixed lens support frame 6. The fixed barrel 2 has three straight grooves 2a. The straight grooves 2a are formed equiangularly around an optical axis. The cam barrel (cam member) 3 is provided so as to be rotatable relative to the fixed barrel 2, and has three cam grooves (cam member) 3a and three cam grooves (cam member) 3b. The cam grooves 3a are formed equiangularly around the optical axis. The cam grooves 3b are formed equiangularly around the optical axis. The variator lens support frame 4 has three cam followers (cam member) 4a. The compensator lens support frame 5 has three cam followers (cam member) 5a. When the cam barrel 3 rotates, the cam followers 4a are movable along an optical axis "o" with the straight grooves 2a and the cam grooves 3a, and the cam followers 5a are movable along the optical axis "o" with the straight grooves 2a and the cam grooves 3b. With such configuration, zooming operation is performed.

On the compensator lens support frame 5, there are provided spring shafts 7, bias rings 8, and compression springs (second elastic members) 9 at least at two or more (a plurality of) positions equiangularly with respect to the optical axis, and the bias ring 8 is retained in a state of being held in abutment against a regulation portion 7a, which is provided at a distal end of the spring shaft 7, by the compression spring 9. In the first embodiment, the spring shafts 7, the bias rings 8, and the compression springs 9 are provided at three positions equiangularly with respect to the optical axis.

Further, tension springs (first elastic members) 10 are provided between the compensator lens support frame 5 and the fixed lens support frame 6 to bias the compensator lens support frame 5 in the direction indicated by the arrow A.

Figure 2:
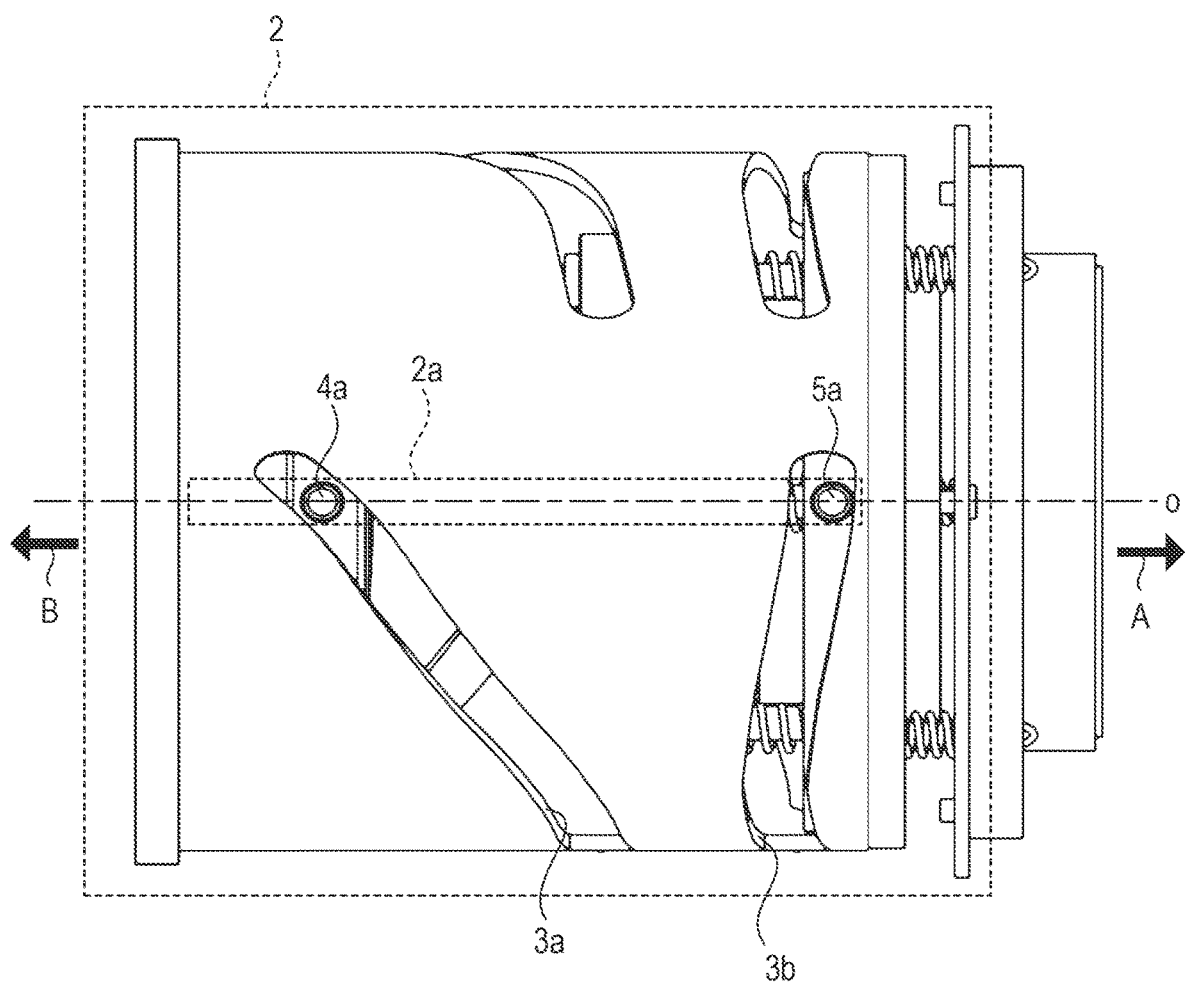
FIG. 2 is an illustration of the zoom unit mechanism as seen in the direction indicated by the arrow Y of FIG. 1.

FIG. 2 is an illustration of a state of the zoom mechanism unit 1 corresponding to the state of FIG. 1 as seen in the direction indicated by the arrow Y.

The cam followers 5a of the compensator lens support frame 5 are retained in a state of being held in abutment against wall surfaces of the cam grooves 3b, which are formed in the direction indicated by the arrow A, by a biasing force of the tension springs 10.

The biasing force does not act on the cam followers 4a of the variator lens support frame 4, and hence the cam followers 4a have a backlash in the cam grooves 3a.

Figure 3:
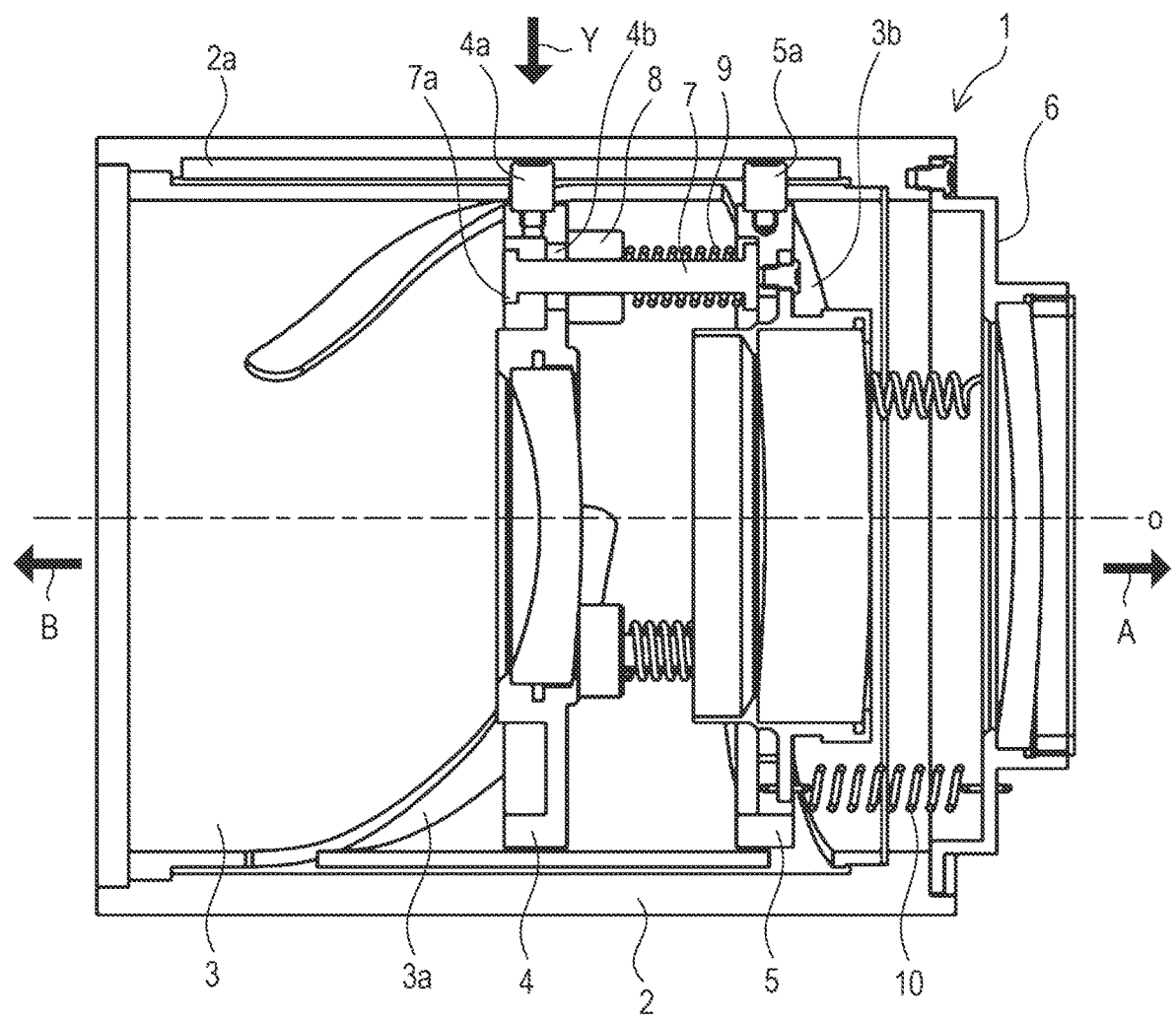
FIG. 3 is a sectional view for illustrating the zoom unit mechanism after zooming in the first embodiment of the present invention.

When the cam barrel 3 is rotated for zooming, the zoom mechanism unit 1 is brought into the state illustrated in FIG. 3.

In this state, when a distance between the variator lens support frame 4 and the compensator lens support frame 5 is reduced to be equal to or smaller than a predetermined distance, the variator lens support frame 4 and the bias rings 8 are brought into contact with each other. The variator lens support frame 4 has through holes 4b. The spring shafts 7 pass through the through holes 4b, and the bias rings 8 compress the compression springs 9 while being held in contact with the variator lens support frame 4.

Figure 4:
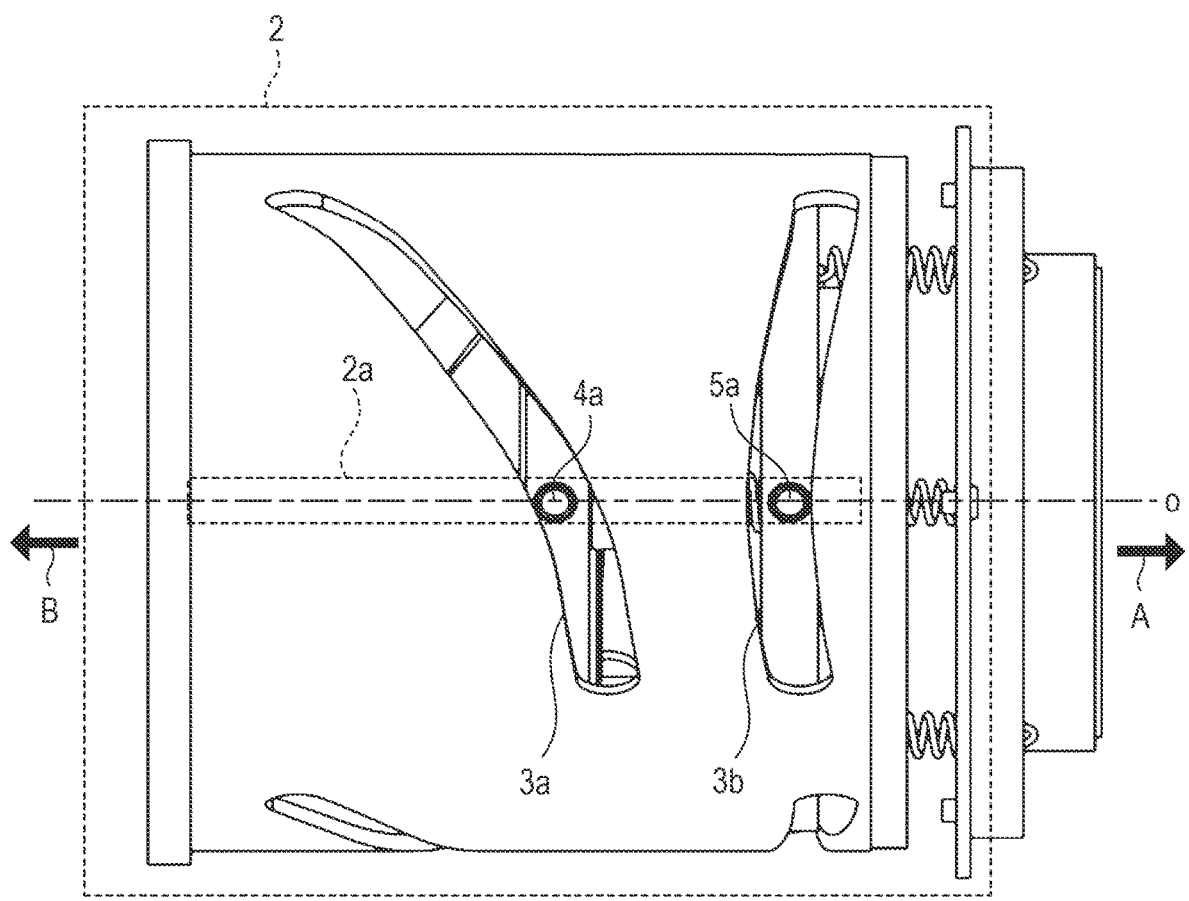
FIG. 4 is an illustration of the zoom unit mechanism as seen in the direction indicated by the arrow Y of FIG. 3.

FIG. 4 is an illustration of a state of the zoom mechanism unit 1 corresponding to the state of FIG. 3 as seen in the direction indicated by the arrow Y.

The cam followers 5a of the compensator lens support frame 5 are retained in a state of being held in abutment against wall surfaces of the cam grooves 3b, which are formed in the direction indicated by the arrow A, by a biasing force of the tension springs 10.

Further, the variator lens support frame 4 is biased in the direction indicated by the arrow B by a biasing force of the compression springs 9, and the cam followers 4a are retained in a state of being held in abutment against wall surfaces of the cam grooves 3a, which are formed in the direction indicated by the arrow B.

In this case, the biasing force of the compression springs 9 acts also on the compensator lens support frame 5. However, the biasing force of the compression springs 9 acts in the direction indicated by the arrow A, which is the same direction as the direction of the biasing force of the tension springs 10, and hence a posture of the compensator lens support frame 5 does not change.

As described above, in the zoom mechanism unit of the lens apparatus according to the first embodiment, two lens groups are biased within a certain focal length range or larger in which an influence of a distance error between a variator lens unit (second optical element) and a compensator lens unit (first optical element) on an optical performance of the lens apparatus becomes greater.

With this, the biasing force does not act in a focal length range other than required, and hence an actuating force required for zooming is reduced, thereby improving operability. Moreover, a compensator lens (first lens group) having a great influence on a focus position is always biased in the same direction as the bias direction in which a variator lens (second lens group) is biased. Therefore, a change in posture of the compensator lens at the time of contact with the bias rings is suppressed, thereby being capable of reducing a change in focus position.

In the first embodiment, description is made of the configuration of the spring members which act on the lens group support frames of the zoom unit. However, similar operation can be performed as long as there is given a configuration in which an optical element such as a focus unit or an iris unit moves in an optical axis direction. Moreover, in the first embodiment, description is made of the cam structure with the cam followers. However, similar operation can be performed in a mechanism which is configured to drive the optical element in the optical axis direction.

Second Embodiment

Figure 5:
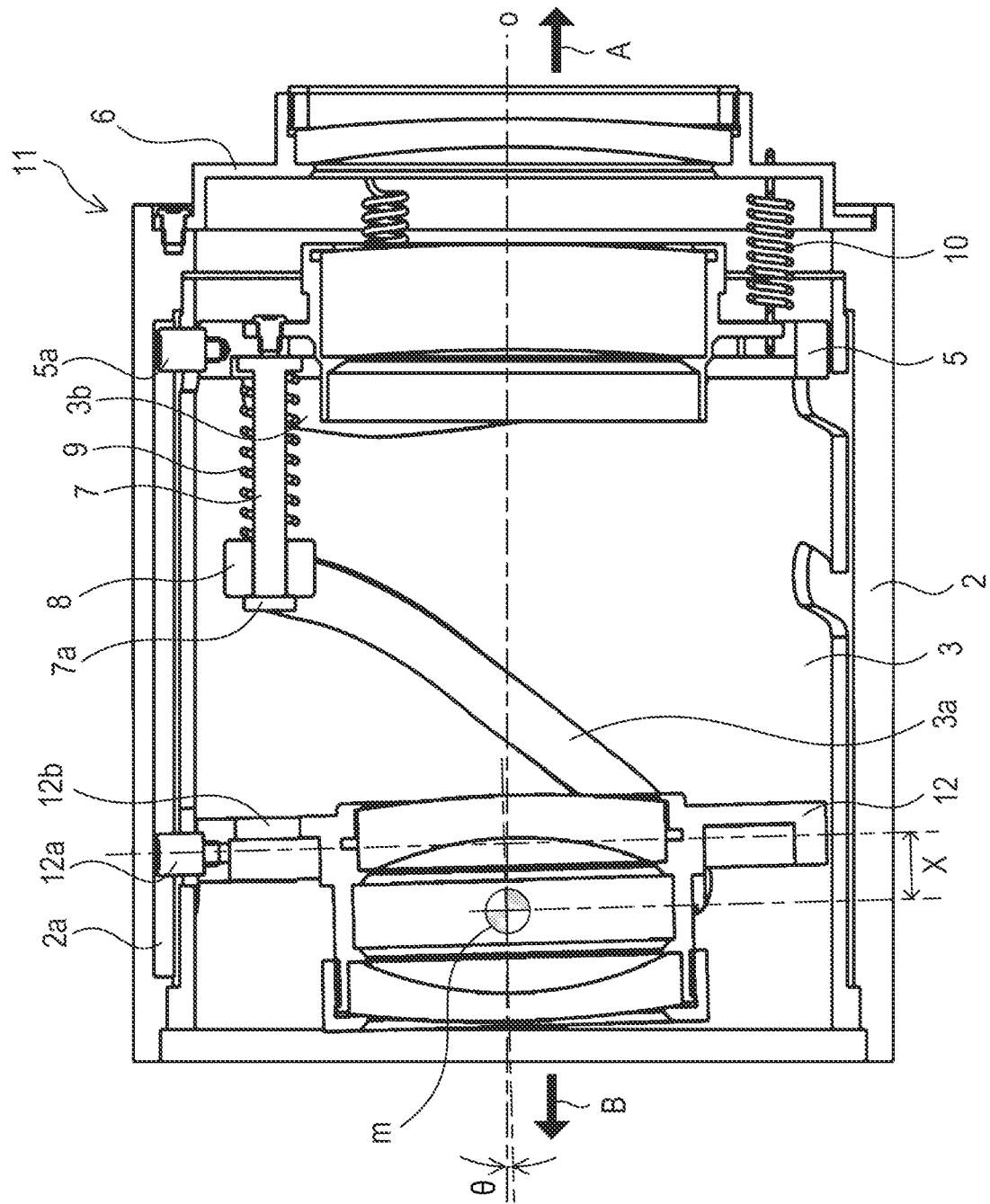
FIG. 5 is a sectional view for illustrating a zoom unit mechanism in a second embodiment of the present invention.
Figure 6:
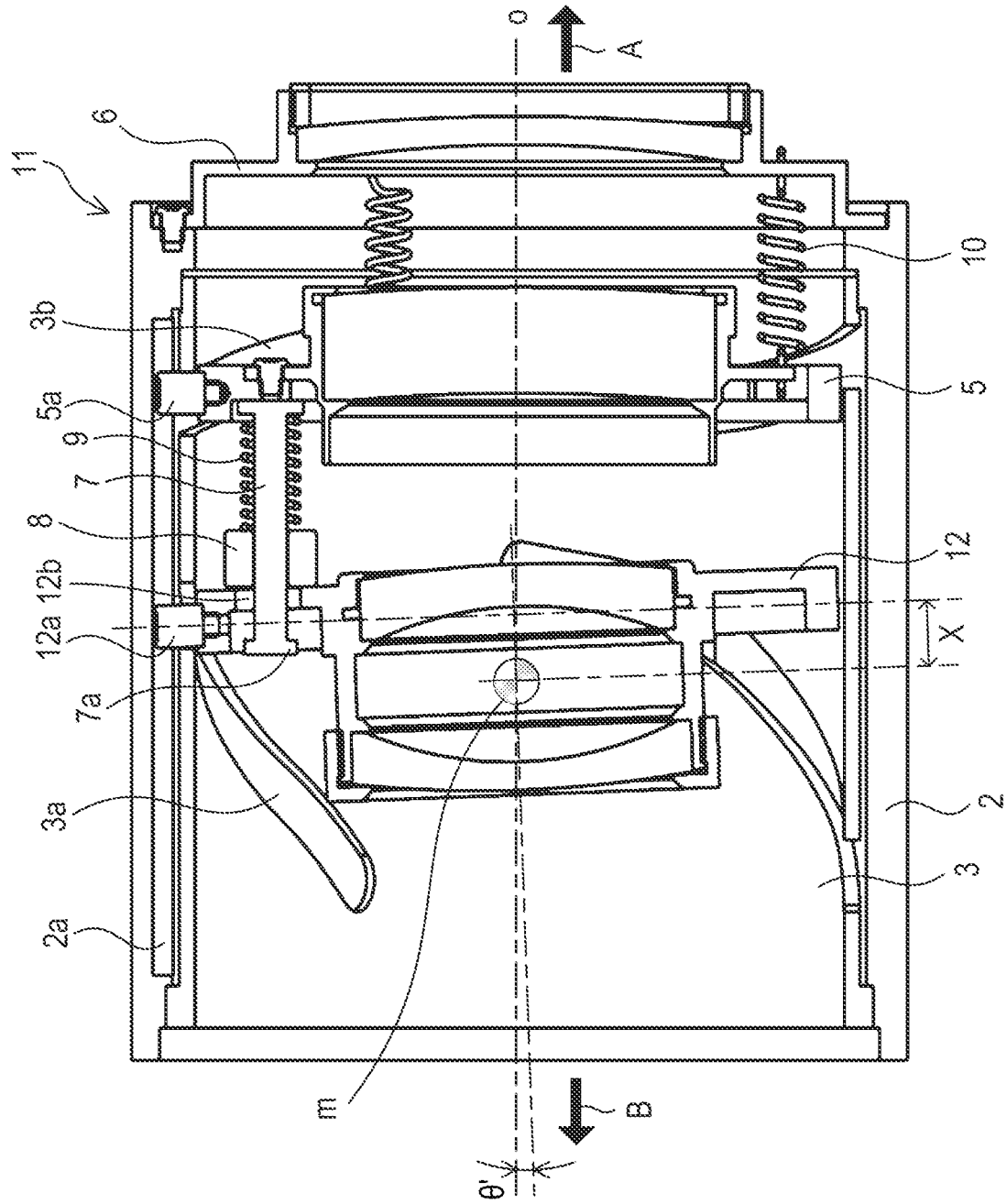
FIG. 6 is a sectional view for illustrating the zoom unit mechanism after zooming in the second embodiment of the present invention.

Now, with reference to FIG. 5 and FIG. 6, description is made of a lens apparatus according to a second embodiment of the present invention. FIG. 5 is a sectional view for illustrating a zoom mechanism unit 11 of the lens apparatus according to the second embodiment.

The zoom mechanism unit 11 of the lens apparatus is configured to move a variator lens support frame 12 and the compensator lens support frame 5 in the optical axis direction with a structure which is the same as that of the zoom mechanism unit 1 of the first embodiment. A gravity center "m" of the variator lens support frame 12 is positioned apart by a distance "x" from a plane including centers of a plurality of cam followers 12a. Thus, with the center of the cam follower 12a as a support point, moment acting in a counterclockwise direction in FIG. 5 is generated, with the result that the variator lens support frame 12 is brought into a state of being inclined by an angle θ from the optical axis in a backlash between the cam groove 3a and the cam follower 12a.

On the compensator lens support frame 5, there are provided the spring shaft 7, the bias ring 8, and the compression spring 9 in non-symmetry with respect to the optical axis. More specifically, the spring shaft 7, the bias ring 8, and the compression spring 9 are provided at least at one position on one side, and the bias ring 8 is retained in a state of being held in abutment against the regulation portion 7a, which is provided at the distal end of the spring shaft 7, by the compression spring 9. In the second embodiment, the spring shaft 7, the bias ring 8, and the compression spring 9 are arranged at one position on an upper side in FIG. 5 with respect to the optical axis.

When the cam barrel 3 is rotated for zooming, the zoom mechanism unit 11 is brought into the state illustrated in FIG. 6.

In this state, a distance between the variator lens support frame 12 and the compensator lens support frame 5 is reduced, and the variator lens support frame 12 and the bias ring 8 are brought into contact with each other. The variator lens support frame 12 has a through hole 12b. The spring shaft 7 passes through the through hole 12b, and the bias ring 8 compresses the compression spring 9 while being held in contact with the variator lens support frame 12.

In addition to the moment generated by the gravity center "m", moment generated by the spring force of the compression spring 9 acts on the variator lens support frame 12. The inclination θ' from the optical axis of the variator lens support frame 12 caused by the action of the moment is determined by an amount of the backlash between the cam groove 3a and the cam follower 12a.

In this case, the direction of the moment acting on the variator lens support frame 12 by the gravity center "m" and the direction of the moment acting on the variator lens support frame 12 by the compression spring 9 are the same in a plane including the optical axis (more specifically, in a vertical plane). Therefore, the direction of the inclination of the variator lens support frame 12 is maintained constant before and after the contact between the variator lens support frame 12 and the bias ring 8. That is, the position at which the spring shaft 7, the bias ring 8, and the compression spring 9 are arranged is arranged so that the moment by the gravity center "m" and the moment by the compression spring 9 are oriented in the same direction in a highly frequently used posture of the lens apparatus. That is, the spring shaft 7, the bias ring 8, and the compression spring 9 are arranged in non-rotation symmetry around the optical axis. More specifically, as exemplified in FIG. 5, when the gravity center "m" of the variator lens support frame 12 is located on an object side with respect to the center of the cam follower 12a, the spring shaft 7, the bias ring 8, and the compression spring 9 are arranged so as to press an upper portion of the variator lens support frame 12. Meanwhile, when the gravity center "m" of the variator lens support frame 12 is located on an image side with respect to the center of the cam follower 12a, the spring shaft 7, the bias ring 8, and the compression spring 9 are arranged so as to press a lower portion of the variator lens support frame 12.

As described above, in the zoom mechanism unit of the lens apparatus according to the second embodiment, even when the biasing force for reducing the distance error between the variator lens and the compensator lens acts, the direction of the inclination of the variator lens can be maintained constant. With this, a change in lens performance due to a change in inclination of the variator lens can be reduced, and hence shooting of a favorable image in an entire zoom region can be performed.

In the second embodiment, description is made of the configuration of the spring member which acts on the lens group support frames of the zoom unit for magnification. However, similar operation can be performed as long as there is given a configuration in which an optical element such as a focus unit to be used for focusing or an iris unit to be used for adjustment of light amount moves in the optical axis direction. Moreover, in the second embodiment, description is made of the cam structure with the cam followers. However, similar operation can be performed in a mechanism which is configured to drive the optical element in the optical axis direction.

In the embodiments described above, description is made of the example case in which the spring shaft 7 is fixed to the compensator lens support frame 5. However, the present invention is not limited to such configuration, and the spring shaft 7 may be fixed to the variator lens support frame. However, the compensator lens support frame 5 is always biased toward the image side by the tension spring, and hence the direction of the wall against which the cam follower 5a is held in abutment in the cam groove 3b is stabilized on the image side. Therefore, it is more preferred that the spring shaft 7 be fixed to the compensator lens support frame 5.

Moreover, with the configuration of an image pickup apparatus including the lens apparatus according to the present invention and an image pickup element configured to receive an optical image formed by the lens apparatus, an image pickup apparatus enjoying the effect of the present invention can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-213582, filed Nov. 6, 2017, which is hereby incorporated by reference herein in its entirety.

What is claimed is:

1. An optical apparatus comprising:
   a first optical element configured to be movable in an optical axis direction;
   a second optical element configured to be movable in the optical axis direction;
   a first elastic member configured to bias the first optical element in the optical axis direction; and
   a second elastic member configured to:
      not be in contact with at least one of the first optical element or the second optical element so as to not bias the first optical element and the second optical element in the optical axis direction in a case where a distance between the first optical element and the second optical element is larger than a predetermined distance;
      be in contact with the first optical element and the second optical element so as to bias the first optical element and the second optical element in the optical axis direction in a case where the distance between the first optical element and the second optical element is not larger than the predetermined distance; and
      bias the first optical element in a direction in which the first elastic member biases the first optical element in the case where the distance between the first optical element and the second optical element is not larger than the predetermined distance.

2. The optical apparatus according to claim 1, wherein:
   the second optical element and the first optical element are arranged in order from an object side toward an image side, and
   the first elastic member is configured to bias the first optical element toward the image side.

3. The optical apparatus according to claim 1, wherein the second elastic member is configured to, in the case where the distance between the first optical element and the second optical element is not larger than the predetermined distance:
   bias the first optical element in a direction away from the second optical element; and
   bias the second optical element in a direction away from the first optical element.

4. The optical apparatus according to claim 1, wherein the first elastic member comprises a plurality of elastic members respectively arranged at a plurality of positions around the optical axis.

5. The optical apparatus according to claim 1, wherein the second elastic member is supported by one of the first optical element or the second optical element.

6. The optical apparatus according to claim 1, wherein the first optical element comprises a compensator lens unit, and the second optical element comprises a variator lens unit.

7. The optical apparatus according to claim 1, further comprising a cam member configured to move the first optical element and the second optical element.

8. The optical apparatus according to claim 1, further comprising an image pickup element configured to receive an image formed via the first optical element and the second optical element.

9. The optical apparatus according to claim 1, wherein the second elastic member comprises a plurality of elastic members respectively arranged at a plurality of positions around the optical axis.

10. The optical apparatus according to claim 9, wherein the second elastic member comprises a plurality of elastic members respectively arranged at three positions around the optical axis.

11. The optical apparatus according to claim 1, wherein the second elastic member is configured to bias the second optical element via a portion of the second optical element to cause moment to act in a direction of moment on the second optical element due to a position of a center of gravity of the second optical element being spaced in the optical axis direction from a supported portion of the second optical element.

12. The optical apparatus according to claim 11, wherein the second elastic member consists of a single elastic member.

13. The optical apparatus according to claim 1, wherein at least one of the first elastic member or the second elastic member comprises a spring.

14. The optical apparatus according to claim 13, wherein the first elastic member comprises a tension spring, and the second elastic member comprises a compression spring.

15. The optical apparatus according to claim 1, wherein at least one of the first optical element or the second optical element comprises at least one of a lens or a stop.

16. The optical apparatus according to claim 15, wherein the lens is configured to be moved for at least one of zooming or focusing.

* * * * *